United States Patent [19]

McMillin

[11] 3,995,441

[45] Dec. 7, 1976

[54] BEVERAGE DISPENSING SYSTEM

[75] Inventor: John R. McMillin, St. Paul, Minn.

[73] Assignee: The Cornelius Company, Golden Valley, Minn.

[22] Filed: July 15, 1975

[21] Appl. No.: 596,174

Related U.S. Application Data

[62] Division of Ser. No. 389,808, Aug. 20, 1973, Pat. No. 3,898,861.

[52] U.S. Cl. ................................ 62/177; 236/99 D

[51] Int. Cl.[2] .................... F25D 17/00; G05D 23/12

[58] Field of Search ............ 62/177, 179, 180, 399, 62/503, 200, 390, 525; 236/99 D

[56] References Cited

UNITED STATES PATENTS

| | | | |
|---|---|---|---|
| 886,201 | 4/1908 | Fournier | 236/99 |
| 2,529,782 | 11/1950 | Morrison | 62/399 X |
| 2,565,350 | 8/1951 | Burns et al. | 236/78 X |
| 2,577,902 | 12/1951 | Mc Grath | 62/8 UX |
| 3,180,108 | 4/1965 | Rhodes | 62/399 X |
| 3,621,673 | 11/1971 | Foust | 62/503 |

FOREIGN PATENTS OR APPLICATIONS

| | | | |
|---|---|---|---|
| 1,384,519 | 3/1964 | France | 236/DIG. 6 |

*Primary Examiner*—William E. Wayner
*Attorney, Agent, or Firm*—Hill, Gross, Simpson, Van Santen, Steadman, Chiara & Simpson

[57] ABSTRACT

A beverage dispensing system has a water line to be connected to a source of water, a refrigeration evaporator line extending through and along a length of the water line, and a thermostatic control that has a sensing element extending along refrigerated portions of the water line.

14 Claims, 5 Drawing Figures

WATER
STRAINER
COMPRESSOR
CONDENSOR

BEVERAGE DISPENSING SYSTEM

BACKGROUND

This invention pertains to a beverage dispensing system of the type that has a refrigerated water supply.

SUMMARY OF THE INVENTION

The present invention is directed to a beverage dispening system wherein a refrigeration evaporator line extends through and along a length of a water line, a thermostatic control for the refrigeration system sensing temperature along refrigerated portions of the water line.

Accordingly, it is an object of the present invention to provide a beverage dispensing system which includes a specially constructed water supply.

Other advantages, featues and additional objects of the present invention will become manifest to those verse in the art upon making reference to the detailed description and the accompanying sheets of drawings in which a preferred structural embodiment incorporating the principles of the present invention is shown by way of illustrative example.

ON THE DRAWINGS

AS SHOWN ON THE DRAWINGS

Figure 1:
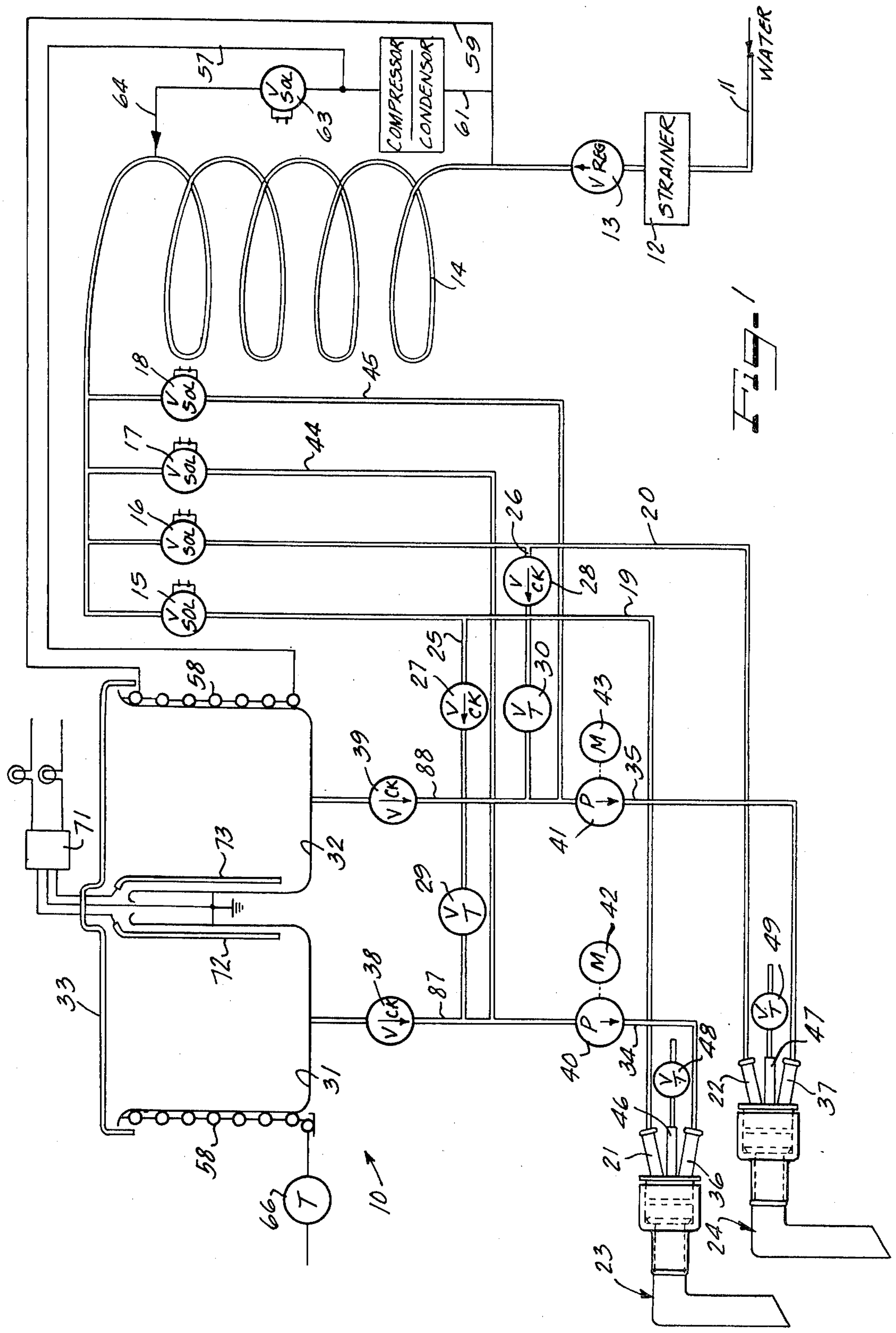
FIG. 1 is a diagrammatic view of a beverage dispenser having a water supply provided in accordance with the principles of the present invention.

The principles of the present invention are particularly useful when embodied in a beverage dispenser such as diagrammatically illustrated in FIG. 1, generally indicated by the numeral 10. The beverage dispensing system includes a supply of water having a water line with a water inlet 11 for being connected to a source of pressurized potable water. The inlet 11 leads to a strainer 12 which is connected to a pressure regulating valve 13 from which the water line 14 extends in the form of a helical coil. The line 14 is connected to each of four solenoid valves 15–18, two of which are connected by a pair of lines 19,20 with a water inlet 21,22 on a mixing and dispensing spout 23,24. The valves 15,16 supply a pair of bypass lines 25,26, each having a check valve 27,28 and a throttling valve 29,30.

The system 10 further includes a pair of storage tanks 31, 32 having a cover 33, each tank 31,32 serving as a source of liquid flavored beverage ingredient. Each of the sources 31,32 is connected by a line 34,35 to the inlets 36,37 of the spouts 23,24. Each ingredient line 34,35 has a check valve 38,39, and the bypass lines 25,26 are connected to the ingredient lines 34,35. Each ingredient line 34,35 has a control member 40,41 shown here as a pump driven by an electric motor 42,43.

The valves 17,18 are connected by a pair of lines 44,45 with the beverage ingredient lines 34,35.

Each of the spouts 23,24 has an air inlet 46,47 connected to a valve 48,49.

Operation of this portion of the system is described in detail in my patent identified above.

Figures 2, 3:
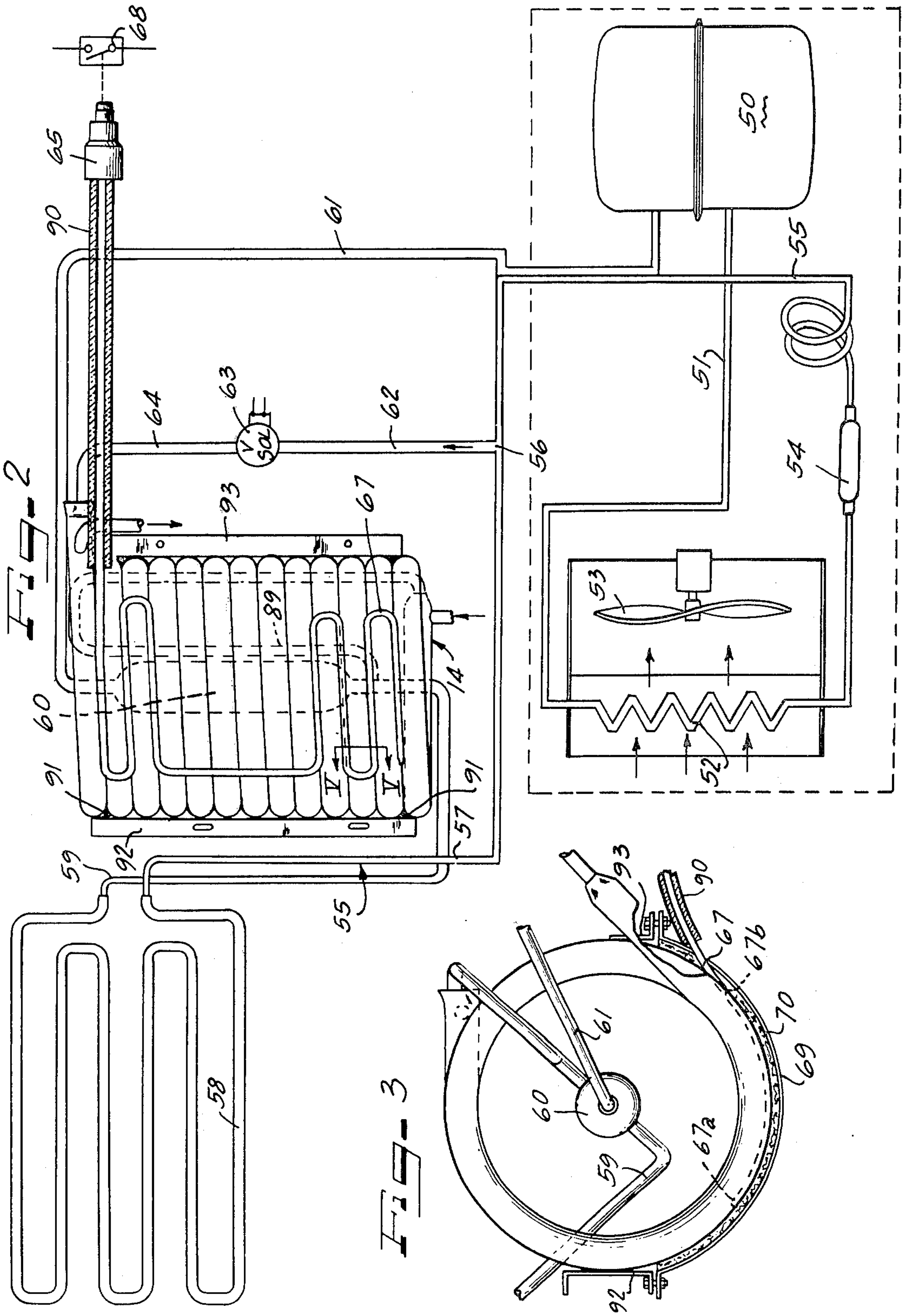
FIG. 2 is a diagrammatic view of the refrigeration system shown in FIG. 1.
FIG. 3 is a top plan view of a portion of FIG. 2.
Figure 5:
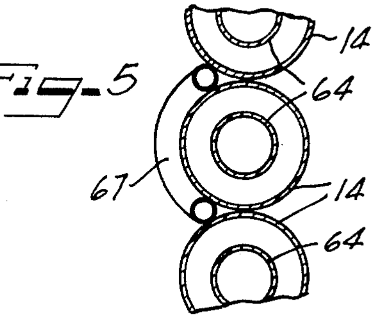
FIG. 5 is an enlarged cross-sectional view taken along line V—V of FIG. 2.

The helical water coil 14 and the beverage ingredient sources 31,32 are refrigerated by a refrigeration system shown in FIG. 2. A hermetically sealed motor-compressor 50 has an output line 51 leading to a condenser coil 52 which is air-cooled by a ventilating fan 53. The line 51 then leads to a strainer-dryer 54 and thence through several feet of a first capillary tubing 55 which typically has an inside diameter of 0.049 inch. The line 55 divides at a point 56 and a second capillary tubing 57 of smaller inside diameter leads to an evaporator coil 58 which is disposed in heat-exchange relationship with the sources 31,32. The discharge end of the evaporator coil 58 passes through a downwardly directed suction line 59 (for draining the evaporator coil 58) to an accumulator 60 which is connected to a suction line 61 leading to the motor-compressor 50. The other branch 62 leads through a solenoid valve 63 to a line 64 which is arranged in the form of a vertical helical coil, the discharge end, as shown in dashed lines, being also connected to the lower end of the accumulator 60 via a vertical loop or trap 89 which prevents backflow of refrigerant into the helical coil 64 from the evaporator 58. The upper and lower loops of the coil 14 are bonded as at 91 to a pair of mounting brackets 92,93, for a purpose explained below. The helical coil portion of the refrigerant line 64 is disposed within the helical water coil 14 as best seen in FIG. 5. Although the turns of the helical coil of the refrigeration line 64 are shown as being concentric with the individual turns of the water line's helical coil 14, the actual location is at random since the coils are formed after the assembly is made. Refrigerant enters the upper end of the helical coil and exits through the lower end, while the warmer water enters the lower end of the coil 14 and flows in surrounding relation to the refrigerant coil and exits at the upper end. The accumulator 60 is disposed within the helical coil 14, as shown.

To control the refrigeration system which is common to both of the flavor systems, a first thermostatic control 65 is provided which is responsive to the temperature of the water line helix 14, and a second temperature control 66, shown in FIG. 1 is disposed so as to be responsive to the temperature of the beverage ingredient source. The first thermostatic control 65 has a sensing element 67 and an electric switch 68, and is of the limited vapor filled type so that it is responsive to the coldest part of the sensing elemenet. The sensing element 67 is constructed with a zig-zag portiion at the lower end of the helical coil 14 and a shorter zig-zag portion hear the upper end thereof. Thus the coldest water which is at the upper end of the helical coil 14 is sensed to open the switch 68 and the warmest water, such as fresh incoming water is sensed at the lower end of the water coil 14 to call for refrigeration. The sensing element 67 extends from the top of the water line 14 and is covered with insulation 90 which shields the element 67 from the cold air around the water coil 14 which air, during operation of the refrigeration system, will be colder than the water coil 14. As is explained below, the switch 68 is in circuit with the refrigeration solenoid valve 63 which is normally closed so that unless the thermostatic control 65 is calling for refrigeration, the solenoid valve 63 will be closed. When refrigeration is called for, the compressor 50, the fan 53 and the solenoid valve 63 are simultaneously energized.

As seen in FIGS. 2 and 5 the various portions or stretches of the sensing element 67 lies intermediate adjacent turns of the water helix 14 and in direct engagement with both adjacent turns for ensuring good heat transfer and for obtaining accurate sensing of water temperature. To maintain the three legs of the upper zig-zag and the four legs of the lower zig-zag in intimate engagement as described, there is provided an arcuate clamp 69 shown only in FIG. 3 which acts through slightly yieldable insulation 70 to maintain good contact between the sensing element 67 and the water line helix 14, for example, as seen between the points 67*a* and 67*b*. With this arrangement, water flowing through the helical water coil 14 has extensive and intimate contact with the helical portion of the evaporator line 64. The bonds 91 prevent axial spreading of the loops of the coil 14 when the clamp 69 is tightened.

The evaporator line 58 is in parallel to the lines 62,64 and is controlled only by the capillary tubing 55 and 57 from a refrigerant gas standpoint, while the second thermostatic control 66 is arranged to turn the compressor 50 and fan 53 on and off. Thus when either thermostatic control 65 or 66 calls for refrigeration, the evaporator coil 58 will receive refrigerant gas. There is no likelihood of freezeup in the sources 31,32 owing to the sugar content of the beverage ingredient or concentrate, while the thermostatic control 65 which typically operates in the temperature range between 35° and 38° F keeps the temperature of the coldest water above freezing. A liquid level senser 71 has two sensing elements 72,73, respectively insulatingly disposed for extending into concentrate in the concentrate sources 31,32. When the liquid level falls below either of them, a circuit is closed to a warning lamp for indicating that the supply of beverage ingredient is low.

Figure 4:
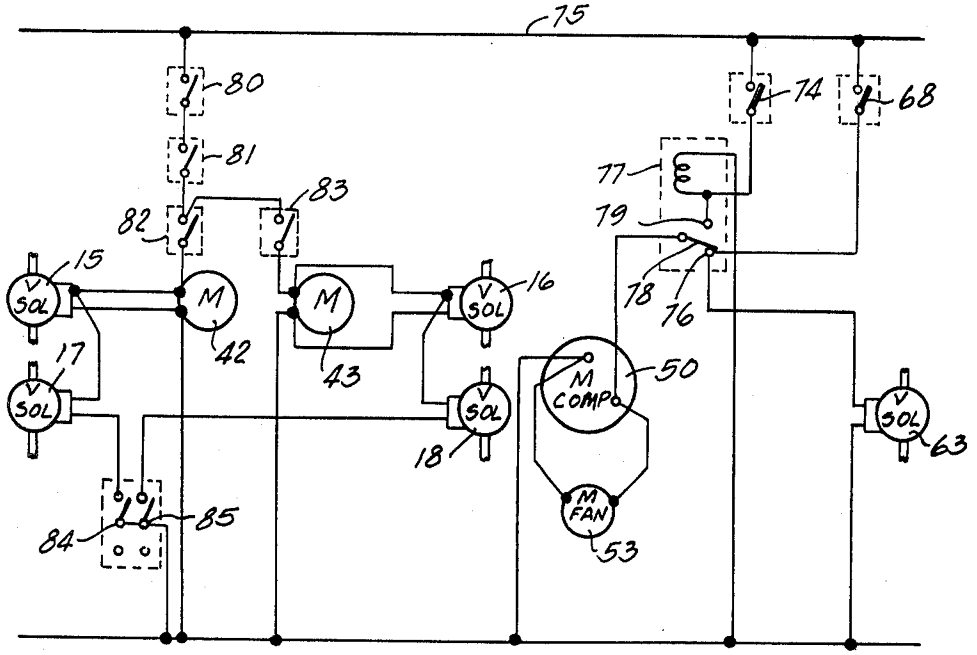
FIG. 4 is a diagram of electrical circuitry utilized in the system of FIG. 1.

The electrical circuitry for operating the beverage dispenser is shown in FIG. 4. The thermostatic control 66 has a switch 74. A line 75 brings power to the switches 74,68. The water thermostat switch 68 is connected to the normally closed stationary contact 76 of relay 77 and is also connected to bring power to the solenoid of the refrigeration valve 63. The movable or armature contact 78 of the relay 77 is connected to bring power to the motor of the compressor 50 and to the motor of the fan 53. Thus anytime that the water coil 14 needs refrigerating, the thermostatic control 65 energizes the parallel-connected refrigeration valve 63, compressor 50 and fan 53.

The switch 74 which is a part of the concentrate thermostat 66 brings power to the coil of the relay 77 and also brings power to the normally open stationary contact 79. Thus when the switch 74 is closed alone, power is delivered to the compressor 50 and fan 53.

The circuitry for the refrigeration system is independent of other switches so that if the dispenser 10 is plugged into a power source, it cannot be shut off accidentally.

Power is also brought through a key-controlled switch 80 which when locked is in the open position, thereby preventing unauthorized dispensing. The switch 80 is in series with a master switch 81 connected to a pair of dispensing switches 82,83 connected to power the valve 15 and the motor 42, and the valve 16 and the motor 43 respectively. The valves 17,18 are also connected to receive power from the switches 82,83 there being a flushing switch 84,85 in each return line.

The check valves 38 and 39 are spaced by line portions 87, 88 from the point at which the flush lines 44,45 are connected, the purpose of which is set forth in the parent application.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A refrigeration system for first and second sources of beverage ingredient, comprising:

a. a condensor;

b. a refrigeration compressor having a discharge connection to said condensor;

c. a first evaporator adapted to be in heat exchange relationship with the first source of beverage ingredient;

d. a second evaporator adapted to be in heat exchange relationship with the second source of beverage ingredient;

e. a refrigeration line, including a first capillary tube, connected at its upstream end to said condensor;

f. a valve interconnecting the downstream end of said line to said first evaporator;

g. a further refrigeration line, including a second capillary tube, interconnecting said downstream end of said first-named line to said second evaporator;

h. an accumulator;

i. a first suction line from said first evaporator and a second suction line from said second evaporator, both of said suction lines being connected to said accumulator, and a further suction line from said accumulator to said compressor; and j. thermostatic control means adapted to sense the temperature of beverage ingredient in the first source, and connected to actuate said valve and said compressor.

2. A refrigeration system according to claim 1 in which said second capillary tube is sized to have a greater restriction to refrigerant flow than said first capillary tube.

3. A refrigeration system according to claim 1 in which said first evaporator is a helical coil and said accumulator is disposed centrally of said coil.

4. A refrigeration system according to claim 3 in which the turns of said coil extend about a vertical axis, said first suction line extending upwardly in a loop between the lower end of said first evaporator and the lower end of said accumulator for precluding liquid refrigerant from draining from said accumulator into said first evaporator.

5. A refrigeration system according to claim 4 in which said second suction line extends under said coil to the lower end of said accumulator.

6. A beverage mixing and dispensing system, comprising:

a. a water line for being connected at one end to a pressurized source of water, its other end leading to an outlet;

b. a refrigeration system having an evaporator line extending through and along a length of said water line;

c. a thermostatic control for said refrigeration system having a sensing element extending along refrigerated portions of said water line;

d. a source of liquid flavored beverage ingredient;

e. a second evaporator line connected in parallel with said first-named evaporator line and disposed to refrigerate said source of beverage ingredient;

f. a second thermostatic control for said refrigeration system responsive to the temperature of said source of beverage ingredient; and g. a valve in said first-named evaporator line under the control of said first-named thermostatic control.

7. A beverage dispensing system which includes a supply of water, said supply comprising:

a. a water line a length of which is arranged as a helical coil for being connected at one end to a pressurized source of water, its other end leading to an outlet;

b. a refrigeration system having an evaporator line arranged as a helical coil extending through and along said length of said water line and thus surrounded therby; and c. a thermostatic control for said refrigeration system having a sensing element being arranged in a zig zag manner and extending along refrigerated portions of said water line in engagement with successive adjacent pairs of turns of the water coil, said sensing element having a longer portion engaging the outlet end of said water coil which is shorter than the portion engaging the inlet end.

8. A beverage dispensing system which includes a supply of water, said supply comprising:

a. a water line length of which is arranged as a helical coil for being connected at one end to a pressurized source of water, its other end leading to an outlet;

b. a refrigeration system having an evaporator line arranged as a helical coil extending through and along said length of said water line and thus surrounded thereby;

c. a thermostatic control for said refrigeration system having a sensing element being arranged in a zig zag manner and extending along refrigerated portions of said water line in engagement with successive adjacent pairs of turns of the water coil;

d. an arcuate clamp forcing said sensing element into positive engagement with said successive adjacent pairs of the water coil; and e. yieldable insulation between said clamp and said sensing element.

9. A beverage dispensing system which includes a supply of water, said supply comprising:

a. a water line a length of which is arranged as a helical coil for being connected at one end to a pressurized source of water, its other end leading to an outlet;

b. a refrigeration system having an evaporator line arranged as a helical coil extending through and along said length of said water line and thus surrounded thereby; and c. a thermostatic control of the limited vapor fill type for said refrigeration system and having a sensing element, a portion of said sensing element extending along the lengths of and in heat transfer with a plurality of turns at the inlet end of the water coil, another portion of said sensing element extending along the lengths of and in heat transfer with a plurality of turns at the outlet end of the water coil, and an intermediate portion of said sensing element extending transversely to the other turns comprising a central portion of the water coil.

10. A beverage dispensing system according to claim 9 in which said sensing element extends from the top of said water coil to said thermostatic control.

11. A beverage dispensing system according to claim 10 in which the portion of said sensing element which extends through air between said water coil and said thermostatic control is covered with insulation where exposed to surrounding air cooled by said refrigeration system so as not to be affected by the temperature thereof.

12. A beverage dispensing system according to claim 9 in which the refrigeration system includes an accumulator connecting the evaporator to a suction line, said accumulator being disposed in a cylindrical air space of said water line coil in radially spaced non-heat-transfer relation thereto.

13. A beverage dispensing system which includes a supply of water, said supply comprising:

a. a water line a length of which is arranged as a helical coil for being connected at one end to a pressurized source of water, its other end leading to an outlet;

b. a refrigeration system havng an evaporator line arranged as a helical coil extending through and along said length of said water line and thus surrounded therby; and c. a thermostatic control of the limited vapor fill type for said refrigeration system and having a sensing element, said sensing element being arranged in a zig-zag manner with horizontal portions therof each in parallel engagement with successive adjacent pairs of turns of the water coil.

14. A beverage dispensing system according to claim 13 including an arcuate clamp surrounding said sensing element forcing said sensing element into direct positive engagement with said successive adjacent pairs of the water coil.

* * * * *